United States Patent
Cheng

(10) Patent No.: US 10,521,389 B2
(45) Date of Patent: Dec. 31, 2019

(54) METHOD AND APPARATUS FOR ACCESSING NON-VOLATILE MEMORY AS BYTE ADDRESSABLE MEMORY

(71) Applicant: ATI Technologies ULC, Markham (CA)

(72) Inventor: Gongxian Jeffrey Cheng, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 218 days.

(21) Appl. No.: 15/389,811

(22) Filed: Dec. 23, 2016

(65) Prior Publication Data

US 2018/0181519 A1    Jun. 28, 2018

(51) Int. Cl.
| | |
|---|---|
| *G06F 13/40* | (2006.01) |
| *G06F 12/0802* | (2016.01) |
| *G06F 13/16* | (2006.01) |
| *G06F 13/42* | (2006.01) |
| *G06F 12/0804* | (2016.01) |
| *G06F 12/0868* | (2016.01) |

(52) U.S. Cl.
CPC ...... *G06F 13/4022* (2013.01); *G06F 12/0802* (2013.01); *G06F 12/0804* (2013.01); *G06F 12/0868* (2013.01); *G06F 13/16* (2013.01); *G06F 13/4282* (2013.01); *G06F 2212/222* (2013.01); *G06F 2212/60* (2013.01); *G06F 2212/601* (2013.01); *G06F 2213/0026* (2013.01)

(58) Field of Classification Search
CPC .. G06F 12/0802; G06F 13/16; G06F 13/4022; G06F 13/4282; G06F 2212/60; G06F 2213/0026; G06F 12/0246; G06F 12/0862; G06F 2212/2022; G06F 2212/222; G06F 2212/1024; G06F 3/0611; G06F 12/10; G06F 3/061; G06F 12/00; G06F 12/0868; G06F 2212/1021
See application file for complete search history.

(56) References Cited

U.S. PATENT DOCUMENTS

| | | | |
|---|---|---|---|
| 9,251,058 B2* | 2/2016 | Nellans | ............... G06F 12/0246 |
| 9,891,824 B2* | 2/2018 | Chambliss | ............ G06F 3/0604 |
| 2005/0251617 A1 | 11/2005 | Sinclair et al. | |
| 2009/0203430 A1 | 8/2009 | Peek | |
| 2010/0191898 A1 | 7/2010 | Kim et al. | |

(Continued)

*Primary Examiner* — Idriss N Alrobaye
*Assistant Examiner* — Richard B Franklin
(74) *Attorney, Agent, or Firm* — Volpe and Koenig, P.C.

(57) ABSTRACT

Described herein is a method and system for accessing a block addressable input/output (I/O) device, such as a non-volatile memory (NVM), as byte addressable memory. A front end processor connected to a Peripheral Component Interconnect Express (PCIe) switch performs as a front end interface to the block addressable I/O device to emulate byte addressability. A PCIe device, such as a graphics processing unit (GPU), can directly access the necessary bytes via the front end processor from the block addressable I/O device. The PCIe compatible devices can access data from the block I/O devices without having to go through system memory and a host processor. In an implementation, a system can include block addressable I/O, byte addressable I/O and hybrids thereof which support direct access to byte addressable memory by the host processor, GPU and any other PCIe compatible device.

23 Claims, 7 Drawing Sheets

(56) References Cited

U.S. PATENT DOCUMENTS

| | | |
|---|---|---|
| 2011/0292058 A1 | 12/2011 | Herr et al. |
| 2014/0129753 A1* | 5/2014 | Schuette ............. G06F 13/4068 |
| | | 710/301 |
| 2014/0281040 A1 | 9/2014 | Liu |
| 2014/0372657 A1 | 12/2014 | Jones et al. |
| 2015/0324118 A1 | 11/2015 | McCambridge et al. |
| 2016/0098227 A1 | 4/2016 | Bandic et al. |

* cited by examiner

METHOD AND APPARATUS FOR ACCESSING NON-VOLATILE MEMORY AS BYTE ADDRESSABLE MEMORY

CROSS-RELATED APPLICATIONS

This application is related to co-pending application entitled "Method and Apparatus for Connecting Direct Access From Non-volatile Memory to Local Memory, U.S. patent application Ser. No. 15/389,596, filed on Dec. 23, 2016, and to co-pending application entitled "Method and Apparatus for Connecting Non-volatile Memory locally to a GPU through a Local Switch", U.S. patent application Ser. No. 15/389,747, filed on Dec. 23, 2016, and to co-pending application entitled "Method and Apparatus for Integration of Non-volatile Memory", U.S. patent application Ser. No. 15/389,908, filed on Dec. 23, 2016, which are incorporated by reference as if fully set forth.

BACKGROUND

A graphics processing unit (GPU) may be nominally configured with a certain amount of local or dedicated memory, (hereinafter referred to as local), to service operations performed on the GPU. For example, the local memory may be dynamic random access memory. The GPU, which has a byte addressable device such as its local memory, may also have access to non-volatile memory (NVM), which is a type of block addressable memory. In the event that the GPU or certain applications require a transfer of data between the NVM and the local memory, an operating system (OS), display driver, device driver or similar hardware/software entity running on a host computing system typically controls or manages the data transfer process. This data transfer process entails a two hop process; first from the NVM to system memory, and then from the system memory to the local memory. In particular, the NVM data must be first transferred into the system memory via a NVM controller's block input/output (I/O) transfer mechanism. The GPU can then access the data from the local memory. This involves at least using the system memory and results in increased traffic and congestion.

BRIEF DESCRIPTION OF THE DRAWINGS

A more detailed understanding may be had from the following description, given by way of example in conjunction with the accompanying drawings wherein.

DETAILED DESCRIPTION

Described herein is a method and system for accessing a block addressable input/output (I/O) device, such as a non-volatile memory (NVM) and controller or other similarly used devices, as byte addressable memory. A front end processor connected to a high-speed serial computer expansion bus, such as but not limited to, a Peripheral Component Interconnect Express (PCIe) root complex and switch (collectively PCIe switch), performs as a front end interface to the block addressable I/O device to emulate byte addressability. A PCIe device, such as a graphics processing unit (GPU) or other PCIe compatible device, directly accesses the necessary bytes via the front end processor from the block addressable I/O device. That is, PCIe compatible devices can access data from the block addressable I/O devices without having to go through system memory and a host processor. This provides increased GPU performance in terms of bandwidth savings due to bypassing host processor involvement and not having to perform a system memory copy.

Figure 1:
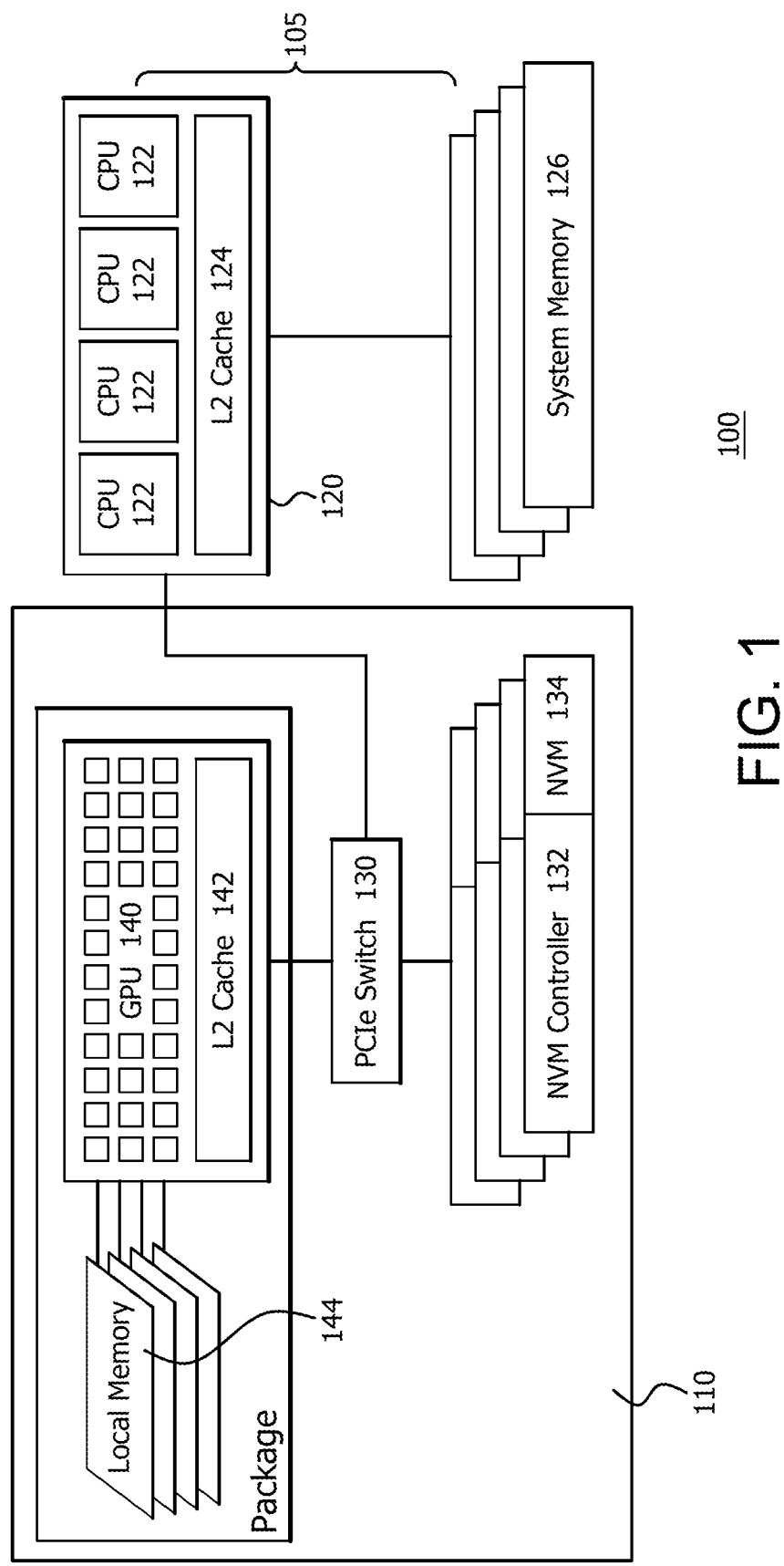
FIG. 1 illustrates a processing system with a host computing system and a solid state graphics (SSG) card in accordance with certain implementations.

Moreover, the front end processor uses a cache to store the accessed blocks, therefore increasing speed and decreasing latency. This also increases available bandwidth and capacity by not having to transfer entire blocks upon subsequent accesses to the block. In an implementation, a system can include block addressable I/O, byte addressable I/O and hybrids thereof which support direct access to byte addressable memory by the host processor, GPU and any other PCIe compatible device. For purposes of illustration and discussion, the terms NVM and NVM controller will be used in the description as an example of the block addressable I/O device without limiting the scope of the specification and claims FIG. 1 shows an example processing system 100 in accordance with certain implementations. The processing system 100 can include a host computing system 105 that is connected to one or more solid state graphics (SSG) cards 110. The host computing system 105 includes a processor 120 which includes one or more central processing units (CPUs) 122 and a L2 cache 124. Processor 120 can be connected to, or in communication with, (collectively "connected to") system memory 126, such as for example dynamic random access memory (DRAM), and to other components that are known to one of ordinary skill in the art.

In general, each SSG card 110 includes a high-speed serial computer expansion bus, such as but not limited to, a Peripheral Component Interconnect Express (PCIe) switch (PCIe switch) 130 for interfacing with processor 120. PCIe switch 130 is shown for purposes of illustration and other electrical or communication interfaces may be used. Each SSG card 110 further includes one or more non-volatile memory (NVM) controllers 132, such as for example, a NVM Express (NVMe) or Non-Volatile Memory Host Controller Interface Specification (NVMHCI) device, for accessing associated NVMs 134 and one or more GPUs 140 that are connected via PCIe switch 130. Each GPU 140 can be connected to a L2 cache 142 and can be locally connected to a memory architecture, which can be a local memory 144, a high bandwidth memory (HBM), a double data rate fourth-generation synchronous dynamic random-access memory (DDR4), a double data rate type five synchronous graphics random access memory (GDDR5), a hybrid memory cube or other similarly used memories, for example, along with associated controllers. For purposes of illustration and discussion, the term local memory will be used in the description as an example of the memory architecture without limiting the scope of the specification and claims. Each NVM controller 132 can manage and access an associated NVM 134 and in particular, can decode incoming commands from host computing system 105 or GPUs 140. This configuration is illustrative and other configurations can be implemented within the scope of the description and claims.

Figure 2:
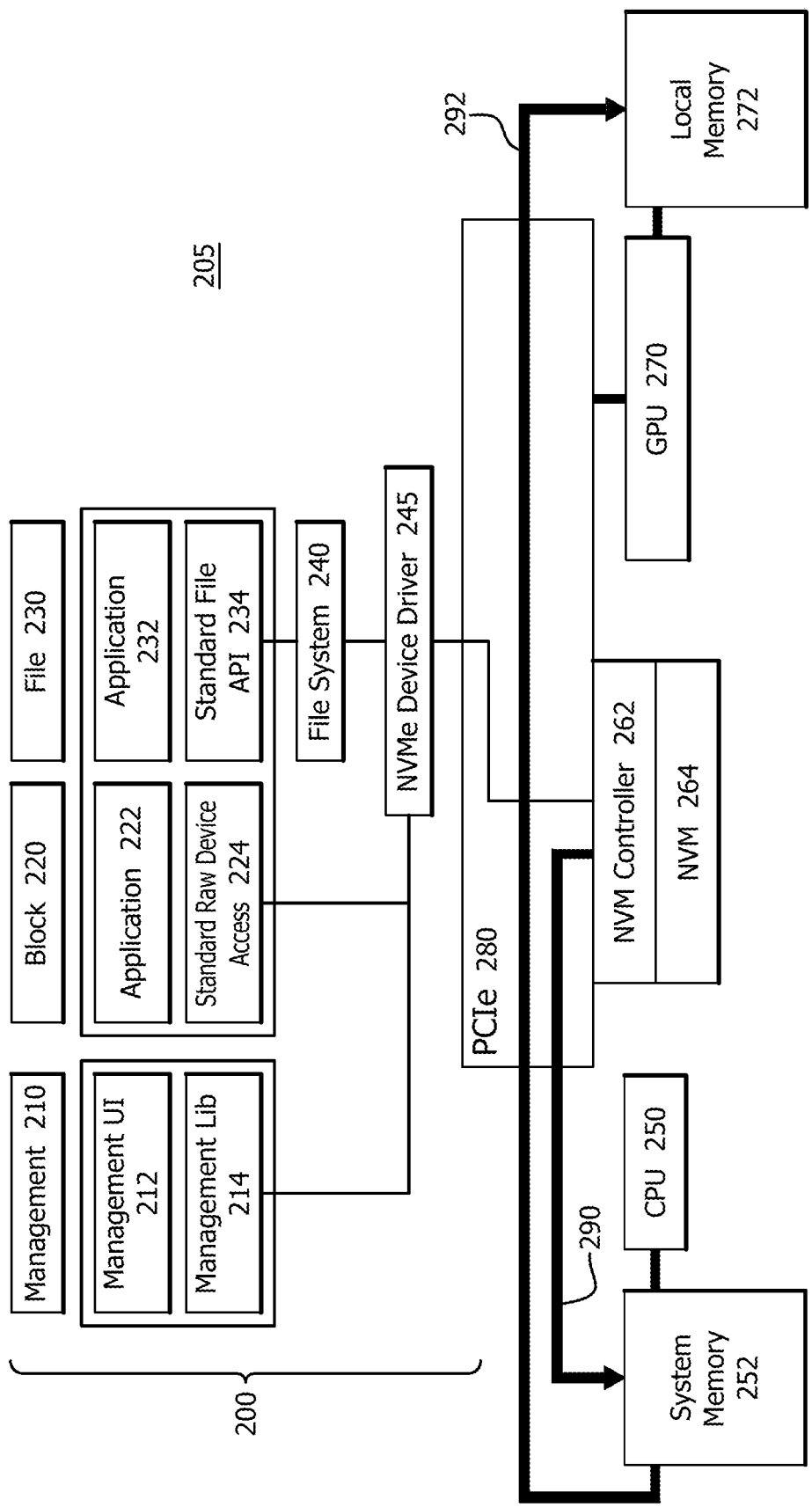
FIG. 2 illustrates a general software stack and hardware architecture.

FIG. 2 illustrates software interoperability for processing systems such as, for example, processing system 100 in FIG. 1. FIG. 2 uses a simplified processing system 205 to illustrate software and hardware interoperability using software stack 200. Processing system 205 includes a CPU 250 connected to system memory 252, a NVM controller 262 connected to NVM 264 and a GPU 270 connected to local memory 272, all of which are connected via PCIe switch 280.

Functionality of software stack 200 is well-known to one of ordinary skill in the art and the following is a representative and illustrative example. In general, a software stack 200 operates on CPU 250. Software stack 200 includes, but is not limited to, a management stack 210, a block access application program interface (API) 220, a file access API 230, a file system 240, a NVM device driver 245 and other software components such as an operating system (OS) (not shown). Management stack 210 provides system administrative tools and includes a management user interface (UI) 212 and management libraries 214, which are used to control and configure file system 240, format volumes, and perform other similar functions. Block access API 220 and file access API 230 are input/output (I/O) or access APIs. Block access API 220 is used by an application 222 for accessing memory in various block sizes, such as, 2K, 4K, 8K, 16K, 64K, 128K etc., via a standard raw device access protocol 224. File access API 230 is used by an application 232 for accessing file system 240 via a standard file API 234. This can be done, using various access protocols such as Network File System (NFS) or Server Message Block (SMB). Both block access API 220 and file access API 230 use a device driver, such as NVM device driver 245, to access memory, such as NVM 264.

In an example of where access operation is done using the I/O or file access APIs of software stack 200, a file is opened and a file handle is created to identify the file for function calls A file mapping handle or object is then created for the file handle. This allocates a virtual address (VA) range or space relative to the size of the file for access by CPU 250. The file is then mapped into the allocated VA space. In the event of an access, the VA space will be hit by the relevant load or store command from CPU 250. Since the VA space is not mapped physically to a portion of memory, the load or store command will generate a fault. The OS will catch the fault and call NVM device driver 245 to issue a block I/O direct memory access (DMA) command to NVM controller 262, for example. The requested data will be copied from NVM 264 to system memory 252, (as shown by data path 290). The OS will map the portion of system memory 252 to the allocated VA space that was faulted and unblock access by CPU 250. As illustrated, application 222 or 232 are unaware of the underlying access mechanism. The OS performs the underlying work of fulfilling the access by making use of the block I/O DMA command provided by a block I/O device, such as NVM controller 262 and NVM 264.

From a hardware perspective, CPU 250 uses a block I/O programming interface, (which is a register interface), to issue DMA commands that copy a block of data in units of, for example, 4 Kbytes, to system memory 252. This is accomplished using a device driver, such as NVM device driver 245, which uses NVM controller's 262 block I/O DMA command to copy and send data to system memory 252. CPU 250 can then access the data from system memory 252. GPU 270 can access the data from system memory 252 via an interconnect bus such as PCIe. Alternatively, a copy of the data is first copied to local memory 272 from system memory 252, (as shown by data path 292). GPU 270 can then access the data from local memory 272.

The above describes a generic memory-mapped file I/O mechanism or block I/O access model. In the generic memory-mapped file I/O mechanism, a sequential series of steps needs to be completed prior to GPU 270 having access to the data. In particular, data is copied, stored in system memory 252, copied again and ultimately stored in local memory 272. During this time, GPU 270 cannot proceed and is in a stalled state. Problematically, GPU 270 does not have direct access to NVM 264. One potential solution to this problem is to use a Non-Volatile Dual In-line Memory Module (NVDIMM), which is a byte-addressable memory-mapped device. However, the NVDIMM is only supported for a dynamic random access memory (DRAM) interface that is connected to the CPU and is not connected to the GPU, which is a PCIe device. This proposed solution is therefore deficient in providing direct access.

Figure 3:
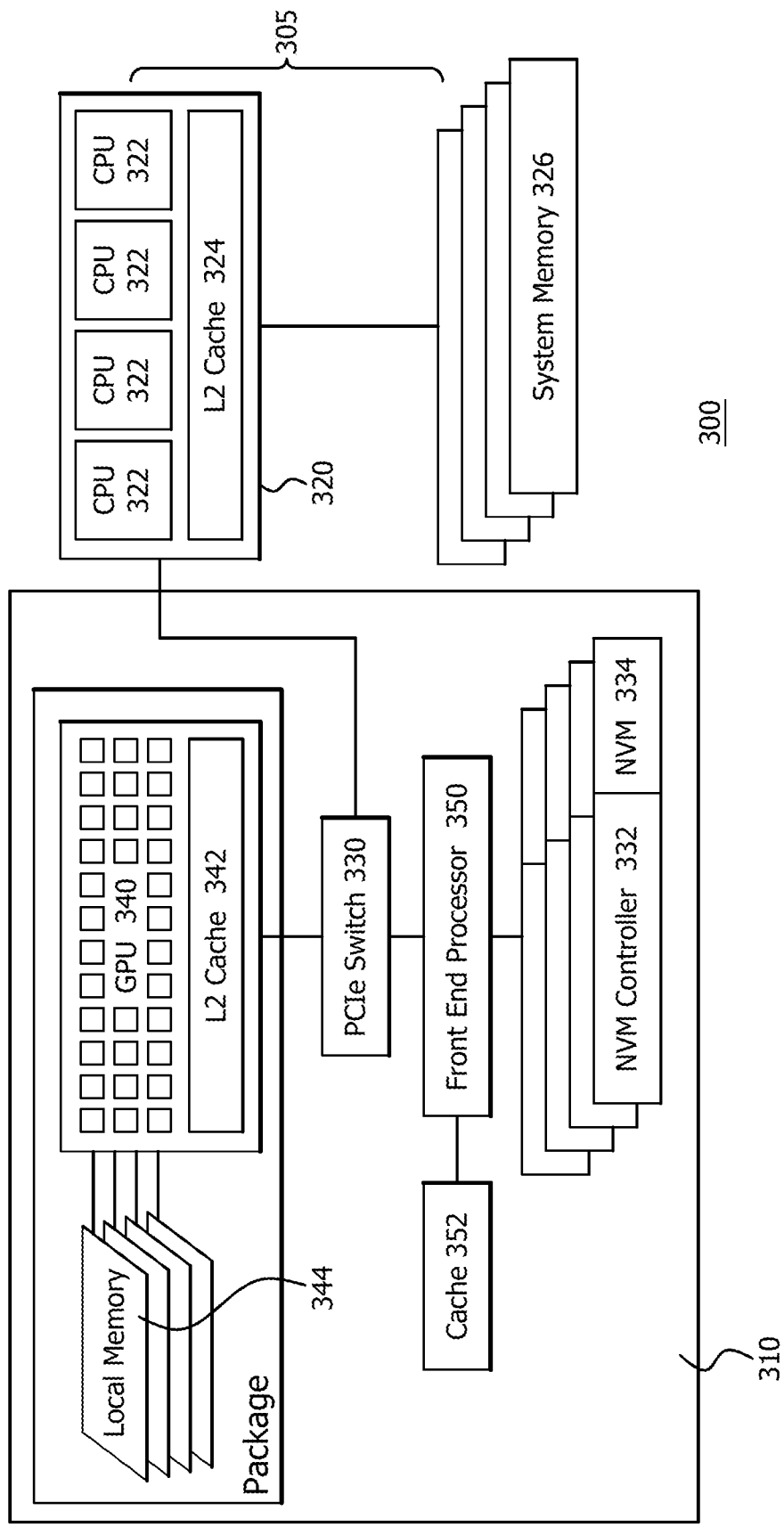
FIG. 3 illustrates a processing system with a host computing system and a solid state graphics (SSG) card in accordance with certain implementations.

FIG. 3 shows an example processing system 300 which provides direct access to block I/O devices in accordance with certain implementations. The processing system 300 can include a host computing system 305 that is connected to one or more SSG cards 310. The host computing system 305 includes a processor 320 which includes one or more CPUs 322 and a L2 cache 324. Processor 320 can be connected to system memory 326, such as for example DRAM, and to other components that are known to one of ordinary skill in the art.

In general, each SSG card 310 includes a PCIe switch 330 for interfacing with processor 320. PCIe switch 330 is shown for purposes of illustration and other electrical or communication interfaces may be used. Each SSG card 310 further includes one or more NVM controllers 332, such as for example, a NVMe or NVMHCI device, for accessing associated NVMs 334 and one or more GPUs 340 that are connected via PCIe switch 330. Each GPU 340 can be connected to a L2 cache 342 and can be locally connected to local memory 344. Each SSG card 310 further includes a front end processor 350, which is co-located with and connected to PCIe switch 330, and is further connected to each of one or more NVM controllers 332. A cache 352 is connected to front end processor 350. Front end processor 350 can be a microprocessor, an embedded microprocessor, field-programmable gate array (FPGA), or similar device which performs as a front-end interface to NVM controller 332 and NVM 334 to emulate byte addressability on the PCIe bus. In particular, and as further described with respect to FIG. 4, front end processor 350 decodes incoming commands from host computing system 305 or GPUs 340, reads the requested bytes from NVM controller 332 and NVM 334, and directly transfers the bytes to CPU 322 or GPU 340, respectively. In an implementation, the bytes can be transferred to L2 cache 324 or L2 cache 342 for access by CPU 322 or GPU 340, respectively. This configuration is illustrative and other configurations can be implemented within the scope of the description and claims.

Figure 4:
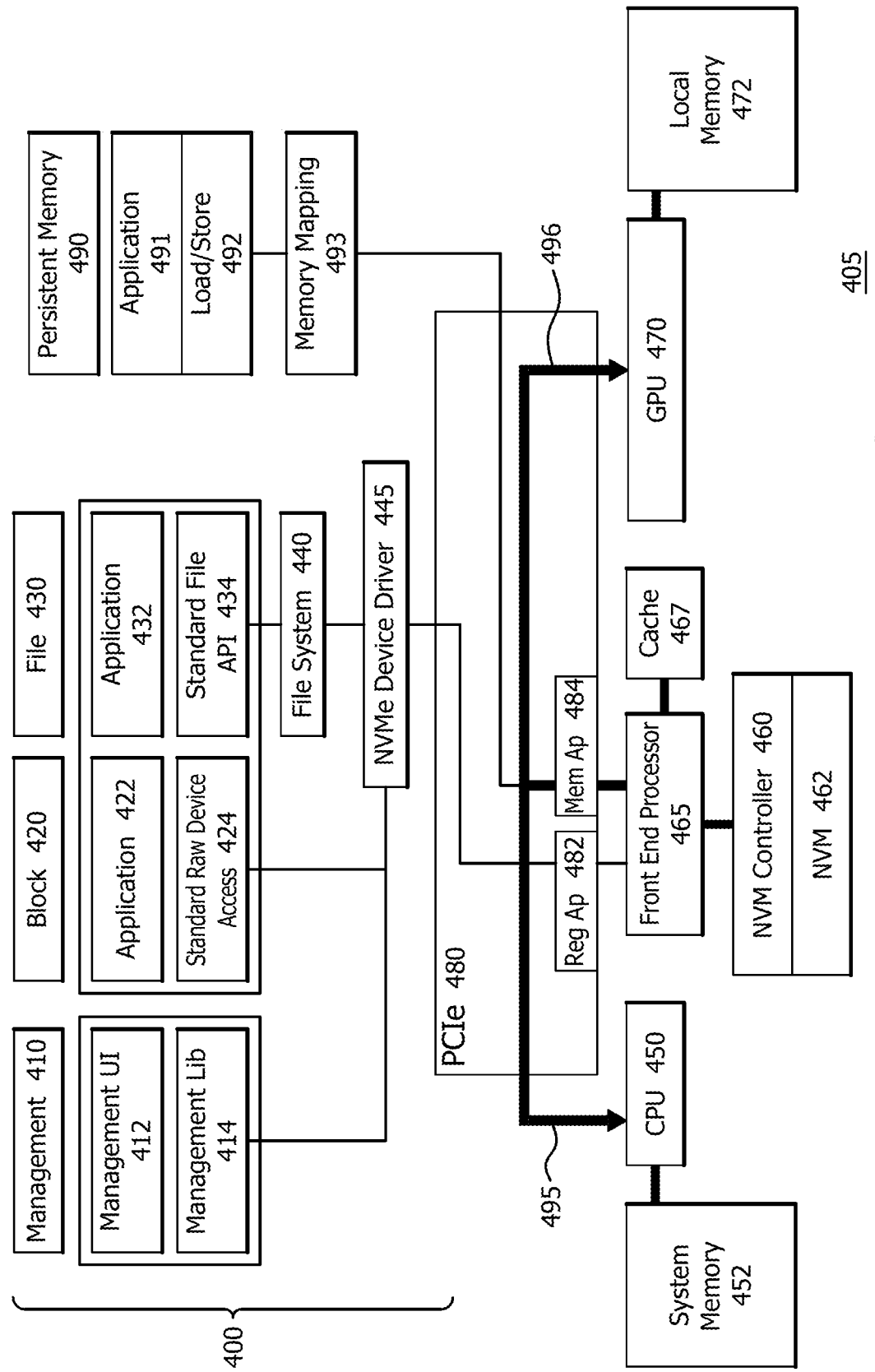
FIG. 4 illustrates a software stack and hardware architecture in accordance with certain implementations.

FIG. 4 illustrates software interoperability for processing systems such as, for example, processing system 300 in FIG. 3. FIG. 4 uses a simplified processing system 405 to illustrate software and hardware interoperability using software stack 400. In general, a software stack 400 operates on CPU 450. Software stack 400 includes, but is not limited to, a management stack 410, a block access application program interface (API) 420, a file access API 430, a file system 440, a NVM device driver 445 and other software components such as an operating system (OS) (not shown). Management stack 410 provides system administrative tools and includes a management user interface (UI) 412 and management libraries 414, which are used to control and configure file system 440, format volumes, and perform other similar functions. Block access API 420 and file access API 430 are input/output (I/O) or access APIs. Block access API 420 is used by an application 422 for accessing memory in various block sizes, such as, 2K, 4K, 8K, 16K, 64K, 128K etc., via a standard raw device access protocol 424. File access API 430 is used by an application 432 for accessing file system 440 via a standard file API 434.

Processing system 405 includes a CPU 450 connected to system memory 452, a NVM controller 460 connected to NVM 462 and a GPU 470 connected to local memory 472, all of which are connected via PCIe switch 480. Processing system 405 further includes a front end processor 465. In an implementation, front end processor 465 can be both a PCIe master, meaning it initiates DMA data transfers to a destination memory address, and a PCIe slave, meaning it responds to another devices memory access requests. In an implementation, front end processor 465 is connected to a cache 467, which can be provided to sustain slave requests. Front end processor 465 is co-located with and connected to PCIe switch 480 via a register aperture 482 and a memory aperture 484. Register aperture 482 and memory aperture 484 are defined under PCIe semantics, (which are also known as Base Address Registers (BARs), and allow peer PCIe devices, such as GPU 470, or CPU 450 to access a target PCIe device, such as NVM controller 460 and NVM 462, using standard PCIe access cycles.

In general, if a data transfer command has a PCIe destination address, (e.g. received from GPU 470 or CPU 450), which falls into one of register aperture 482 or memory aperture 484, the data transfer command is then forwarded to front end processor 465. In the event the PCIe destination address falls into register aperture 482, front end processor 465 performs block addressable processing via the block I/O DMA command of NVM controller 460 as described above. In the event the PCIe destination address falls into memory aperture 484, front end processor 465 performs byte addressable processing. In an implementation, front end processor 465 can operate for read and write accesses, for example. In a read access implementation, front end processor 465 reads the data bytes from cache 467, (if the requested bytes were in a previously requested block), or reads a data block from NVM 462 via a block I/O DMA command of NVM controller 460. The read data block is stored in cache 467 and the requested bytes are forwarded to CPU 450, (as shown by data path 495), or to GPU 470, (as shown by data path 496). In a write access implementation, front end processor 465 writes data bytes to cache 467 and flushes data back to NVM 462 via a block I/O DMA command of NVM controller 460, (if the requested bytes are present in cache 467) or writes data to NVM 462 via a block I/O DMA command of NVM controller 460. Provision of both register aperture 482 and the memory aperture 484 permit both block and byte addressability processing.

Inclusion of front end processor 465 and memory aperture 484 enables, for example, the use of persistent memory stack 490 in addition to block access API 420 and file access API 430. Operation of block access API 420 and file access API 430 is as described above. Persistent memory stack 490 enables an application 491 to perform zero-copy access to NVM 462, for example. That is, application 491 can perform load/store processing 492 via memory mapping processing 493 without I/O processing, no queueing, and no asynchronous reads and/or writes.

Figure 5:
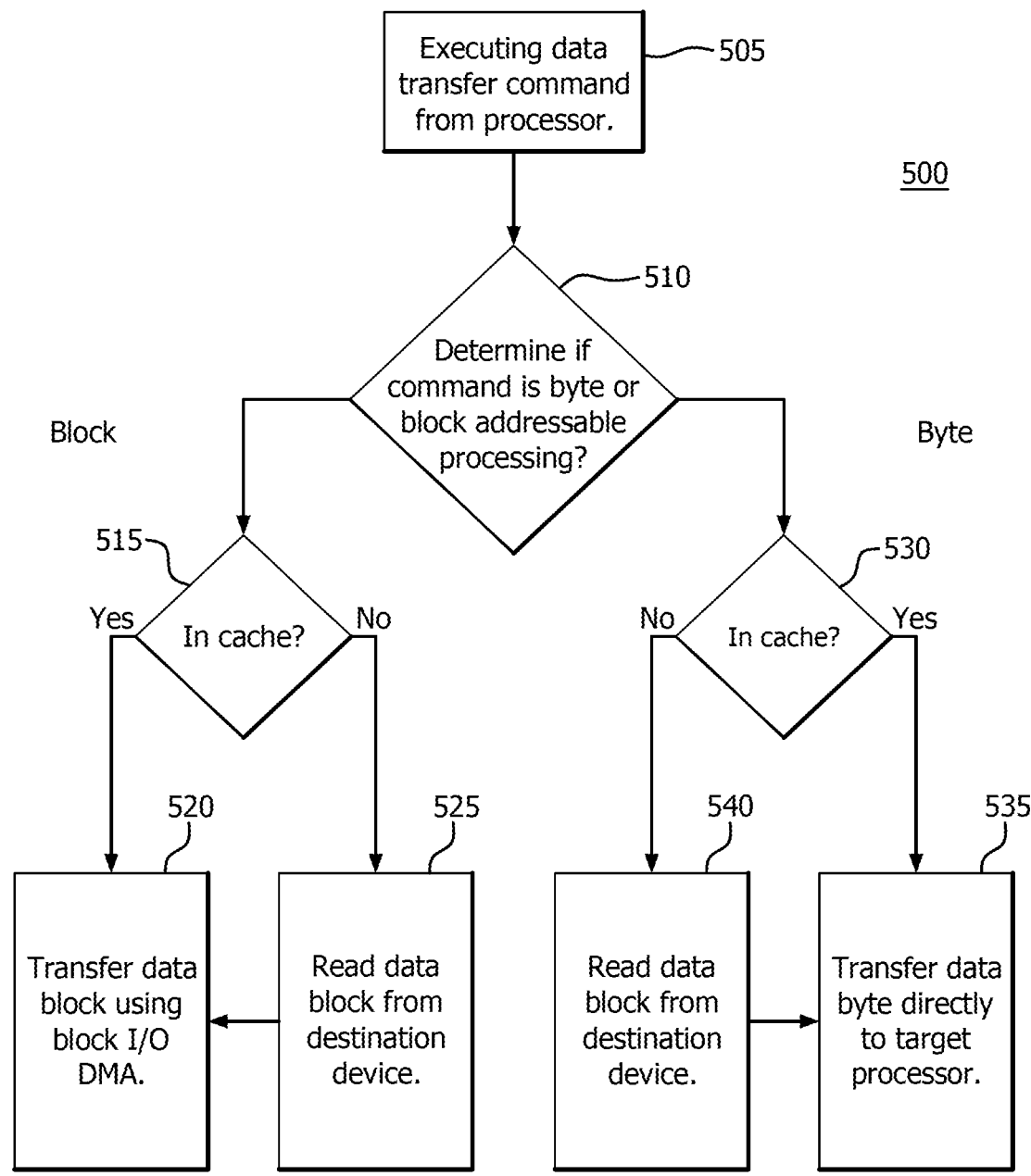
FIG. 5 is a flow diagram using the processing system of FIGS. 3 and 4 in accordance with certain implementations.

FIG. 5, in concert with FIGS. 3 and 4, shows an example flowchart 500 for providing byte addressability for block I/O devices in a read access scenario. A data transfer command or memory access request is sent from a processor, such as processor 320 or GPU 340 (step 505), to a destination device, such as NVM 334 via a local switch, such as PCIe switch 330. In an implementation, a destination address is provided with the data transfer command. A front end processor, such as front end processor 350, determines if the data transfer command requires block addressable processing or byte addressable processing (step 510). In an implementation, whether the data transfer command falls into a register aperture or a memory aperture 484 determines the requirement for block addressable processing or byte addressable processing. In the event of block addressable processing, the front end processor determines if the requested block is in an associated cache, such as cache 352 (step 515). If the requested block is present in the cache, the requested block is transferred via block I/O processing (step 520). In an implementation, block I/O processing can be block I/O DMA command processing. If the requested block is not present in the cache, the requested block is read from the destination device (step 525) and then transferred via block I/O processing (step 520). In an implementation, the requested or read block is saved in cache. In an implementation, the requested block is transferred to system memory regardless of target device.

In the event of byte addressable processing, the front end processor determines if the requested block is in the associated cache (step 530). If the requested byte is present in the cache, the requested byte is transferred directly to a target processor (step 535). If the requested byte is not present in the cache, the block containing the requested byte(s) is read from the destination device (step 540). The front end processer then transfers the requested bytes to the target processor (step 535). In an implementation, the requested or read block is saved in cache.

Figure 6:
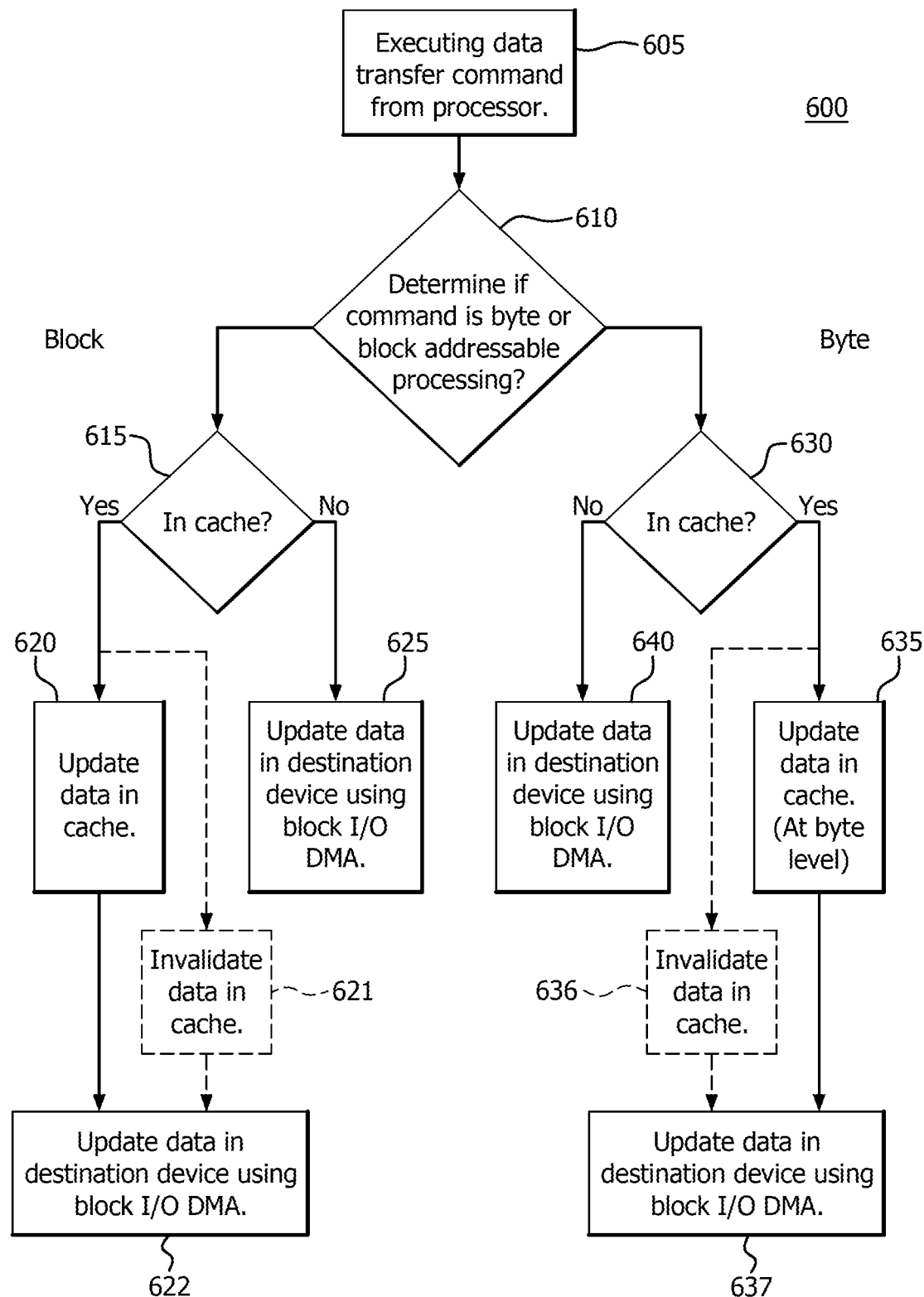
FIG. 6 is a flow diagram using the processing system of FIGS. 3 and 4 in accordance with certain implementations.

FIG. 6, in concert with FIGS. 3 and 4, shows an example flowchart 600 for providing byte addressability for block I/O devices in a write access scenario. A data transfer command or memory access request is sent from a processor, such as processor 320 or GPU 340 (step 605), to a destination device, such as NVM 334 via a local switch, such as PCIe switch 330. In an implementation, a destination address is provided with the data transfer command. A front end processor, such as front end processor 350, determines if the data transfer command requires block addressable processing or byte addressable processing (step 610). In an implementation, whether the data transfer command falls into a register aperture or a memory aperture 484 determines the requirement for block addressable processing or byte addressable processing. In the event of block addressable processing, the front end processor determines if the requested block is in an associated cache, such as cache 352 (step 615). If the requested block is present in the cache, the cache is updated with the data (step 620) and the data is flushed back to the destination device, such as NVM 334, via a block I/O DMA command of NVM controller 332 (step 622). In an implementation, the data in the cache is invalidated (step 621) and the data is updated in the destination device via a block I/O DMA command of NVM controller 332 (step 622). Cache invalidation can be implemented using a variety of techniques and FIG. 6 is illustrative. If the requested block is not present in the cache, the data is updated in the destination device via a block I/O DMA command (step 625).

In the event of byte addressable processing, the front end processor determines if the requested byte is in the associated cache (step 630). If the requested byte is present in the cache, the cache is updated directly, (i.e. at a byte level), (step 635) and the data is flushed back to the destination device, such as NVM 334, via a block I/O DMA command of NVM controller 332 (step 637). In an implementation, the data in the cache is invalidated (step 636) and the data is updated in the destination device via a block I/O DMA command of NVM controller 332 (step 637). If the requested byte is not present in the cache, the data is updated in the destination device via a block I/O DMA command (step 640).

Figure 7:
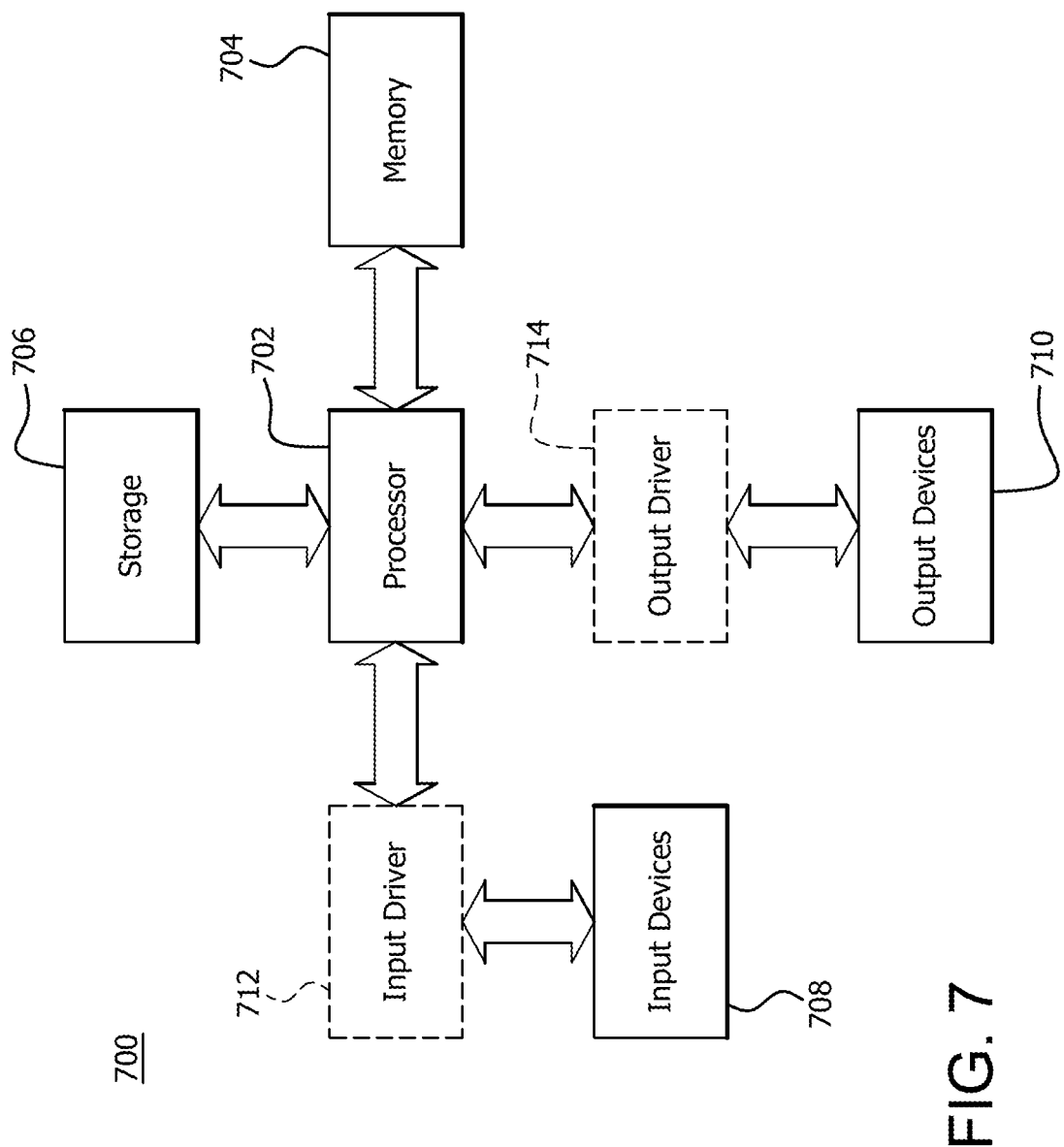
FIG. 7 is a block diagram of an example device in which one or more disclosed implementations may be implemented.

FIG. 7 is a block diagram of an example device 700 in which one portion of one or more disclosed implementations may be implemented. The device 700 may include, for example, a head mounted device, a server, a computer, a gaming device, a handheld device, a set-top box, a television, a mobile phone, or a tablet computer. The device 700 includes a processor 702, a memory 704, a storage 706, one or more input devices 708, and one or more output devices 710. The device 700 may also optionally include an input driver 712 and an output driver 714. It is understood that the device 700 may include additional components not shown in FIG. 7.

The processor 702 may include a central processing unit (CPU), a graphics processing unit (GPU), a CPU and GPU located on the same die, or one or more processor cores, wherein each processor core may be a CPU or a GPU. The memory 704 may be located on the same die as the processor 702, or may be located separately from the processor 702. The memory 704 may include a volatile or non-volatile memory, for example, random access memory (RAM), dynamic RAM, or a cache.

The storage 706 may include a fixed or removable storage, for example, a hard disk drive, a solid state drive, an optical disk, or a flash drive. The input devices 708 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 710 may include a display, a speaker, a printer, a haptic feedback device, one or more lights, an antenna, or a network connection (e.g., a wireless local area network card for transmission and/or reception of wireless IEEE 802 signals).

The input driver 712 communicates with the processor 702 and the input devices 708, and permits the processor 702 to receive input from the input devices 708. The output driver 714 communicates with the processor 702 and the output devices 710, and permits the processor 702 to send output to the output devices 710. It is noted that the input driver 712 and the output driver 714 are optional components, and that the device 700 will operate in the same manner if the input driver 712 and the output driver 714 are not present.

In general, a method for transferring data includes a front end processor which receives via a local switch a data transfer command when a processor needs access to a block input/output (I/O) device. The front end processor byte addressable processes if the data transfer command is received via a first path and checks if a byte requested in the data transfer command is in a cache associated with the front end processor in the event of byte addressable processing. The front end processor, when the data transfer command is a read, reads a block containing the byte from the block I/O device in the event the byte is absent in the cache and directly transfer from the front end processor via the local switch, the byte to a target processor. In an implementation, the processor is one of a graphics processing unit (GPU) or a central processing unit (CPU), the target processor in one of a GPU or CPU, the local switch is a Peripheral Component Interconnect Express (PCIe) switch or root complex and the block I/O device is non-volatile memory (NVM) device. In an implementation, the first path is reception of the data transfer command at a memory aperture of the local switch. In an implementation, the method further determines if a destination address in the data transfer command falls within the memory aperture. In an implementation, the method further stores the block in the cache in the event the block is read from the block I/O device. In an implementation, where the front end processor block addressable processes if the data transfer command is received via a second path. In an implementation, where the second path is reception of the data transfer command at a register aperture of the local switch. In an implementation, the method further determines if a destination address in the data transfer command falls within the register aperture. In an implementation, when the data transfer command is a write, the method further updates the cache in the event the byte is present in the cache and flushes data back to the block input/output (I/O) device.

In general, an apparatus for transferring data includes at least one graphics processing unit (GPU), at least one block input/output (I/O) device, a local switch connected to the at least one GPU, a front end processor connected to the local switch and the at least one block I/O device and a cache connected to the front end processor. The front end processor receives a data transfer command from the GPU when access is needed to the at least one block I/O device, byte addressable processes the data transfer command if the data transfer command is received via a first path, and checks if a byte requested in the data transfer command is in the cache in the event of byte addressable processing. When the data transfer command is a read, the front end processor reads a block containing the byte from the at least one block I/O device in the event the byte is absent in the cache and directly transfers the byte to a target processor. In an implementation, the apparatus further includes a memory aperture in the local switch, where the first path is reception of the data transfer command at the memory aperture of the local switch. In an implementation, the front end processor determines if a destination address in the data transfer command falls within the memory aperture. In an implementation, the front end processor stores the block in the cache in the event the block is read from the at least one block I/O device. In an implementation, the front end processor block addressable processes the data transfer command if the data transfer command is received via a second path. In an implementation, the apparatus further includes a register aperture in the local switch, where the second path is reception of the data transfer command at the register aperture of the local switch. In an implementation, the front end processor determines if a destination address in the data transfer command falls within the register aperture. In an implementation, when the data transfer command is a write, the front end processor updates the cache in the event the byte is present in the cache and flushes data back to the at least one block input/output (I/O) device.

In general, a system for transferring data includes a host processor including a processor and system memory, and at least one solid state graphics (SSG) card. Each SSG card includes at least one graphics processing unit (GPU), at least one block input/output (I/O) device, a local switch connected to the host processor and the at least one GPU, a front end processor connected to the local switch and each block I/O device and a cache connected to the front end processor. The front end processor receives a data transfer command from one of the GPU or host processor when access is needed to the at least one block I/O device, byte addressable processes the data transfer command if the data transfer command is received via a first path, and checks if a byte requested in the data transfer command is in the cache in the event of byte addressable processing, When the data transfer command is a read, the front end processor reads a block containing the byte from the block I/O device in the event the byte is absent in the cache and directly transfers the byte to a target processor via the local switch. In an implementation, the system further includes a memory aperture in the local switch, where the first path is reception of the data transfer command at the memory aperture of the local switch and where the front end processor determines if a destination address in the data transfer command falls within the memory aperture. In an implementation, where the front end processor block addressable processes the data transfer command if the data transfer command is received via a second path, and where the local switch includes a register aperture and the second path is reception of the data transfer command at the register aperture of the local switch.

In general, a computer readable non-transitory medium including instructions which when executed in a processing system cause the processing system to execute a method for transferring data, the method including the steps of receiving, at a front end processor via a local switch, a data transfer command when a processor needs access to a block input/output (I/O) device, byte addressable processing, by the front end processor, if the data transfer command is received via a first path, checking if a byte requested in the data transfer command is in a cache associated with the front end processor in the event of byte addressable processing, and when the data transfer command is a read, reading a block containing the byte from the block I/O device in the event the byte is absent in the cache and directly transferring, from the front end processor via the local switch, the byte to a target processor. In an implementation, wherein the first path is reception of the data transfer command at a memory aperture of the local switch and the method further includes determining if a destination address in the data transfer command falls within the memory aperture and block addressable processing the data transfer command if the data transfer command is received via a second path, where the second path is reception of the data transfer command at a register aperture of the local switch. In an implementation, the computer readable non-transitory medium further including when the data transfer command is a write, updating the cache in the event the byte is present in the cache and flushing data back to the block input/output (I/O) device.

In general and without limiting implementations described herein, a computer readable non-transitory medium including instructions which when executed in a processing system cause the processing system to execute a method for accessing non-volatile memory as byte addressable memory.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transferring data, the method comprising:
    receiving, at a front end processor via a local switch, a first command to read a block of data of a block-addressable input/output (I/O) device, the command received from a processor;
    in response to receiving the first command, copying the block from a block addressable memory of the block I/O device into a second memory location, the second memory location being addressable in chunks less than a block;
    receiving, at the front end processor via the local switch, a second command for access to data of the block I/O device from the processor;
    in response to receiving the second command, determining that the data is included within the block stored in the second memory location; and
    accessing the data in the second memory location according to the second command in chunks smaller than a block.

2. The method of claim 1, wherein the processor is one of a graphics processing unit (GPU) or a central processing unit (CPU), the target processor in one of a GPU or CPU, the local switch is a Peripheral Component Interconnect Express (PCIe) switch or root complex and the block I/O device is non-volatile memory (NVM) device.

3. The method of claim 1, wherein the second command received at a memory aperture of the local switch.

4. The method of claim 1, wherein:
    the second command comprises a read command; and
    accessing the data in the second memory location according to the second command comprises transferring the data to a target processor.

5. The method of claim 1, wherein:
the second command comprises a write command; and
accessing the data in the second memory location according to the second command comprises updating the data in the second memory and flushing the data to the block addressable memory.

6. The method of claim 1, further comprising:
receiving, at the front end processor via the local switch, a third command to write to a second block of data that is not stored in the second memory location; and
responsive to the third command, writing to the block of data in the block I/O device and not to the second memory location.

7. The method of claim 1, wherein the first command received at a register aperture of the local switch.

8. The method of claim 1, further comprising:
receiving, at the front end processor via the local switch, a third command to write to second data that is not stored in the second memory location; and
responsive to the third command, writing to the second data in the block I/O device without writing to the second memory location.

9. The method of claim 1, further comprising:
receiving, at the front end processor via the local switch, a third command to read second data that is not stored in the second memory location; and
responsive to the third command, retrieving the second data from the block I/O device without using the second memory location.

10. An apparatus for transferring data, comprising:
at least one graphics processing unit (GPU);
at least one block-addressable input/output (I/O) device;
a local switch connected to the at least one GPU;
a front end processor connected to the local switch and the at least one block I/O device; and
a second memory location, the second memory being addressable in chunks less than a block, the second memory being connected to the front end processor,
wherein the front end processor is configured to:
  receive a first command from the GPU to read a block of data of a block-addressable input/output (I/O) device of the at least one block-addressable I/O device;
  in response to receiving the first command, copy the block from a block addressable memory of the block I/O device into the second memory location;
  receive, at the front end processor via the local switch, a second command for access to data of the block I/O device from the processor;
  in response to receiving the second command, determine that the data is included within the block, stored in the second memory location; and
  access the data in the second memory location according to the second command in chunks smaller than a block.

11. The apparatus of claim 10, further comprising:
a memory aperture in the local switch, wherein the second command is received at the memory aperture.

12. The apparatus of claim 10, wherein:
the second command comprises a read command; and
accessing the data in the second memory location according to the second command comprises transferring the data to a target processor.

13. The apparatus of claim 10, wherein:
the second command comprises a write command; and
accessing the data in the second memory location according to the second command comprises updating the data in the second memory location and flushing the data to the block addressable memory.

14. The apparatus of claim 10, wherein the front end processor is further configured to:
receive, at the front end processor via the local switch, a third command to write to a second block of data that is not stored in the second memory location; and
responsive to the third command, write to the block of data in the block I/O device and not to the second memory location.

15. The apparatus of claim 10, further comprising:
a register aperture in the local switch, wherein the first command is received at the register aperture.

16. The apparatus of claim 10, wherein the front end processor is further configured to:
receive, at the front end processor via the local switch, a third command to write to second data smaller than a block that is not stored in the second memory location; and
responsive to the third command, write to the second data in the block I/O device without writing to the second memory location.

17. The apparatus of claim 10, wherein the front end processor is further configured to:
receive, at the front end processor via the local switch, a third command to read second data smaller than a block that is not stored in the second memory location; and
responsive to the third command, retrieve the second data from the block I/O device without using the second memory location.

18. A system for transferring data, comprising:
a host processor including a processor and system memory; and
at least one solid state graphics (SSG) card, wherein each SSG card includes:
  at least one graphics processing unit (GPU);
  at least one block-addressable input/output (I/O) device;
  a local switch connected to the host processor and the at least one GPU;
  a front end processor connected to the local switch and each block I/O device; and
  a second memory location, the second memory being addressable in chunks less than a block, the second memory location being connected to the front end processor,
  wherein the front end processor is configured to:
    receive a first command from one of the GPU or host processor to read a block of data of a block-addressable input/output (I/O) device of the at least one block-addressable I/O device;
    in response to receiving the first command, copy the block from a block addressable memory of the block I/O device into the second memory location;
    receive, at the front end processor via the local switch, a second command for access to data of the block I/O device, from one of the GPU or host processor;
    in response to receiving the second command, determine that the data is included within the block stored in the second memory location; and
    access the data in the second memory location according to the second command in chunks smaller than a block.

19. The system of claim 18, further comprising:
a memory aperture in the local switch, wherein the second command is received at the memory aperture.

20. The system of claim 18, wherein:

the second command comprises a read command; and accessing the data in the second memory location according to the second command comprises transferring the data to a target processor.

21. A computer readable non-transitory medium including instructions which when executed in a processing system cause the processing system to execute a method for transferring data, the method comprising the steps of:

receiving, at a front end processor via a local switch, a first command to read a block of data of a block-addressable input/output (I/O) device, the command received from a processor;

in response to receiving the first command, copying the block from a block addressable memory of the block I/O device into a second memory location, the second memory location being addressable in chunks less than a block;

receiving, at the front end processor via the local switch, a second command for access to data of the block I/O device, from the processor;

in response to receiving the second command, determining that the data is included within the block stored in the second memory location; and accessing the data in the second memory location according to the second command in chunks smaller than a block.

22. The computer readable non-transitory medium of claim 21, wherein the second command is received at a memory aperture of the local switch.

23. The computer readable non-transitory medium of claim 21, wherein:

the second command comprises a read command; and accessing the data in the second memory location according to the second command comprises transferring the data to a target processor.

\* \* \* \* \*